US008989062B2

(12) United States Patent
Rahman et al.

(10) Patent No.: US 8,989,062 B2
(45) Date of Patent: Mar. 24, 2015

(54) METHOD AND ARRANGEMENT IN A WIRELESS COMMUNICATION SYSTEM

(75) Inventors: Muhammad Imadur Rahman, Sollentuna (SE); David Astely, Bromma (SE); Fan Sun, Aalborg Øst (DK)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 81 days.

(21) Appl. No.: 13/643,228

(22) PCT Filed: May 4, 2010

(86) PCT No.: PCT/SE2010/050487
§ 371 (c)(1),
(2), (4) Date: Oct. 24, 2012

(87) PCT Pub. No.: WO2011/139189
PCT Pub. Date: Nov. 10, 2011

(65) Prior Publication Data
US 2013/0039235 A1    Feb. 14, 2013

(51) Int. Cl.
*H04J 3/00* (2006.01)
*H04L 12/26* (2006.01)
(Continued)

(52) U.S. Cl.
CPC ............ *H04B 7/0417* (2013.01); *H04B 7/0617* (2013.01); *H04B 7/0626* (2013.01); *H04B 7/0639* (2013.01); *H04B 7/0665* (2013.01); *H04B 7/0465* (2013.01)
USPC ........... 370/280; 370/252; 370/328; 370/329; 375/295

(58) Field of Classification Search
USPC .................... 370/280, 252, 328, 329; 375/295
See application file for complete search history.

(56) References Cited

U.S. PATENT DOCUMENTS

2009/0238303 A1*  9/2009  Mondal et al. ................ 375/295
2009/0323773 A1   12/2009  Bala et al.
(Continued)

FOREIGN PATENT DOCUMENTS

WO         2008115036 A1     9/2008

OTHER PUBLICATIONS

Pantech & Curitel, "Differential PMI Feedback for Overhead Reduction in LTE-A DL MIMO," 3GPP TSG-RAN WG1 #58, R1-093453, Aug. 28, 2009, Shenzhen, China, pp. 1-5.
(Continued)

*Primary Examiner* — Kiet Tang
(74) *Attorney, Agent, or Firm* — Murphy Bilak & Homiller, PLLC (57) ABSTRACT

Method and arrangement in a base station for sending data to a user equipment. The base station comprises an instance of a codebook, corresponding to another instance of the codebook comprised in the user equipment. The method comprises obtaining channel state information from a signal received from the user equipment, estimating a channel to be used for transmitting data to the user equipment, calculating a precoder, based on the obtained channel state information. Further is comprised the steps of selecting a precoding index from the codebook based on the calculated precoder, or selecting a precoding index received from the user equipment, precoding data to be transmitted to the user equipment using the calculated precoder and transmitting the precoded data, a non-user dedicated reference signal and the precoding index on the estimated channel to the user equipment. Further, corresponding method and arrangement in a user equipment are described.

8 Claims, 7 Drawing Sheets

(51) Int. Cl.
*H04W 4/00* (2009.01)
*H04L 27/00* (2006.01)
*H04B 7/04* (2006.01)
*H04B 7/06* (2006.01)

(56) References Cited

U.S. PATENT DOCUMENTS

2010/0054200 A1\* 3/2010 Tsai .............................. 370/329
2010/0091678 A1\* 4/2010 Chen et al. ..................... 370/252
2011/0205963 A1\* 8/2011 Tang et al. ..................... 370/328

OTHER PUBLICATIONS

NEC Group, "MU-MIMO: Demodulation at the UE," 3GPP TSG-RAN WG1 Meeting 58bis, R1-093866, Miyazaki, Japan, Oct. 16, 2009, pp. 1-13.

\* cited by examiner

METHOD AND ARRANGEMENT IN A WIRELESS COMMUNICATION SYSTEM

TECHNICAL FIELD

The present invention relates to a method and arrangement in a base station and to a method and arrangement in a user equipment. In particular, it relates to a mechanism for precoding data.

BACKGROUND

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel and such systems and/or related techniques are commonly referred to as MIMO systems.

With the assistance of the channel quality measurements for link adaptation and scheduling, advanced multi-antenna i.e. MIMO schemes are supported by $3^{rd}$ Generation Partnership Project (3GPP) developments within the Long Term Evolution (LTE) project. Precoding is a promising technique among multi-antenna schemes to improve throughput performance. In LTE, there are two basic methods to obtain the precoder, one is codebook-based and the other is non-codebook-based precoding. In the former method, a set of precoder candidates, a codebook, is pre-defined on both eNodeB i.e. base station and user equipment (UE) sides. The UE selects a preferred precoder from the set and feeds back this preferred precoder to the eNodeB in the form of a precoder index. Then eNodeB takes this feedback into consideration when it decides whether to use the suggested precoder or not. The eNodeB also informs the UE via downlink (DL) control channels about the index of the used precoder. For LTE release 8, cell specific reference signals are transmitted in DL. The UE uses them to obtain channel estimates for the eNodeB antenna ports. These channel estimates can be used to determine the Pre-coding Matrix Index (PMI), but also for demodulation given that the user equipment knows the applied precoder matrix so that it can construct an estimate of the effective channel, which is a product of the channel and the precoder matrix. Therefore, certain feedback and feed-forward signalling is necessary.

As mentioned earlier, in addition to the codebook-based beamforming, LTE also supports more general non-codebook-based beamforming. This support is provided with a so called UE specific, or Dedicated Reference Signal (DRS), which are precoded in the same way as the data and hence can be used for channel estimation for demodulation. This is suitable for both FDD and Time-Division Duplexing (TDD) systems. For TDD, short-term precoding based on instantaneous channel knowledge is possible, whereas for FDD one has to resort to more long term precoding based on estimates of channel statistics rather than realizations. If TDD based systems are in place, the base station is not constrained to select precoding vectors from a certain limited set, but can exploit channel reciprocity to adjust the downlink transmission weights from channel estimates. These estimates could at least be partial Channel State Information at the Transmitter (CSIT) obtained via any uplink transmission process such as Sounding Reference Signal (SRS), or control signalling on Physical Uplink Control Channel (PUCCH) or data transmission on the Physical Uplink Shared Channel (PUSCH), and possibly better optimize the transmission as compared to what is possible if only precoders from a codebook can be used. It may be noted that PUCCH and PUSCH contain reference signals for demodulation, typically covering the same bandwidth as the payload part whereas a sounding reference signals is not associated with transmission of any payload but only transmitted to enable uplink channel estimation with configurable bandwidth and periodicities.

In transmission mode 7, a dedicated reference signal precoded in the same way as the data is used to demodulate the data transmission at the UE, and hence facilitates non-codebook based beamforming. Though DRS provides simpler UE receiver, extra functionality needs to be implemented in the user equipment to support demodulation using UE specific reference signals in addition to demodulation using cell specific reference signals. This feature is an optional one, thus not all UEs in LTE systems are expected to support demodulation using user equipment specific reference signals.

Moreover, the DRS occupy resources for each UE that can not be used for data transmission. In parallel to this, Common Reference Signals (CRS, also known as Cell-specific Reference Signals) are always allocated for purposes such as transmission of common control information, mobility measurements and Channel Quality Indicator (CQI) measurements in LTE Releases 8 and 9.

Furthermore, cell-specific reference signals are typically transmitted in all downlink subframes and over the entire bandwidth. This allows the user equipment to perform interpolation and averaging in the time and frequency domain to improve channel estimation. For the DRS, the user equipment is not allowed to do this but must only use the resource elements with reference signals within a single physical resource block pair. Hence, averaging is allowed only up to a bandwidth of 180 KHz and a time duration of 1 ms.

Blind precoding has been proposed, which focuses on precoding matrix estimation at the receiver side for multi-stream transmission. The blind precoding method is very sensitive to the UE movement and the corresponding Doppler spread. It has been shown that the time correlation between $w_{DL}$ (precoder weights determined at downlink receiver, i.e. eNodeB) and $w_{UL}$ (precoder weights determined at uplink receiver, i.e. UE) drops much faster than the correlation between the elements of the channel matrix. This indicates that after an Uplink (UL) and Downlink (DL) delay, the elements of $H_{UL}$ and $H_{DL}$ may still be related very closely, but the $w_{UL}$ and $w_{DL}$ can be largely different. Here, $H_{UL}$ and $H_{DL}$ are channel matrices for DL and UL direction respectively. So, it could only be applicable for the scenario with a slow time-variant channel, where $H_{DL} \approx H_{UL}$.

Previously for Wideband Code Division Multiple Access (WCDMA) and Code Division Multiple Access (CDMA) 2000 systems, downlink beamforming using common pilot signals, similar to CRS in the LTE system, have been studied, where the beams for data transmission are adapted to match the common pilot beam. Furthermore, previous designs for precoding using cell specific reference signals for WCDMA are designed for a single common reference signal and can hence not be used when there are multiple cell specific reference signals.

SUMMARY

It is therefore an object of the present invention to obviate at least some of the above disadvantages and provide an improved performance in a wireless communication system.

According to a first aspect of the present invention, the object is achieved by a method in a base station. The method aims at sending data to a user equipment. The base station comprises an instance of a codebook, corresponding to another instance of the codebook comprised in the user equipment. The method comprises obtaining channel state information from a signal received from the user equipment. Further, the method comprises estimating a channel to be used for transmitting data to the user equipment, calculating a precoder, based on the obtained channel state information. Also, in addition, the method comprises selecting a precoding index from the codebook based on the calculated precoder, or selecting a precoding index received from the user equipment. Additionally, the method comprises precoding data to be transmitted to the user equipment using the calculated precoder. The precoded data, a non-user dedicated reference signal and the precoding index is then transmitted on the estimated channel to the user equipment.

According to a second aspect of the present invention, the object is achieved by an arrangement in a base station for sending data to a user equipment. The base station comprises an instance of a codebook, corresponding to another instance of the codebook comprised in the user equipment. The arrangement comprises an obtaining unit. The obtaining unit is configured to obtain channel state information from a signal received from the user equipment. Also, the arrangement comprises an estimating unit. The estimating unit is configured to estimate a channel for transmitting data to the user equipment. Furthermore, the arrangement comprises a calculating unit. The calculating unit configured to calculate a precoder, based on the obtained channel state information. Additionally, the arrangement further comprises a selecting unit. The selecting unit is configured to select a precoding index from the codebook. In further addition, the arrangement comprises a precoder. The precoder is configured to precode data to be transmitted to the user equipment, using the calculated precoder. Also, the arrangement comprises a transmitter. The transmitter is configured to transmit the precoded data, a non-user dedicated reference signal and the precoding index on the estimated channel to the user equipment.

According to a third aspect of the present invention, the object is achieved by a method in a user equipment. The method aims at receiving data from a base station. The user equipment comprises an instance of a codebook, corresponding to another instance of the codebook comprised the base station. The method comprises obtaining a non-user dedicated reference signal from the base station. Further, the method comprises estimating a channel for receiving precoded data from the base station, based on the non-user dedicated reference signal. Also, in further addition, the method comprises receiving precoded data and a precoding index from the base station over the channel. Additionally, the method further also comprises extracting demodulation parameters from the codebook, based on the received precoding index. In addition, the method also comprises demodulating the received precoded data based on the extracted codebook parameters.

According to a fourth aspect of the present invention, the object is achieved by an arrangement in a user equipment for receiving data from a base station.

The user equipment comprises an instance of a codebook, corresponding to another instance of the codebook comprised the base station. The arrangement comprises an obtaining unit. The obtaining unit is configured to obtain a non-user dedicated reference signal from the base station. Further, the arrangement also comprises an estimating unit. The estimating unit is configured to estimate a channel for receiving precoded data from the base station, based on the non-user dedicated reference signal. Also, in further addition, the arrangement comprises a receiver. The receiver is configured to receive precoded data and a precoding index from the base station. Additionally, the arrangement comprises an extracting unit. The extracting unit is configured to extract demodulation parameters from the codebook, based on the received precoding index. Also, furthermore, the arrangement comprises a demodulating unit. The demodulating unit is configured to demodulate the received precoded data based on the demodulated codebook parameters.

Embodiments of the present codebook assisted method incorporate the forming non-codebook-based precoding with the assistance of a pre-defined codebook. This allows optimizing, or at least somewhat improving the precoding further as compared to what is possible when only the precoders of the codebook can be used, such as using more antennas than what the codebook is defined for. In fact, this is possible without adding extra functionality, such as the support of demodulation using user equipment specific reference signals, in the user equipment.

Moreover, embodiments of the present solution has the potential of saving resources by eliminating DRS transmission and to improve the channel estimation performance since when common reference signals are used, the user equipment can interpolate and average the channel estimates obtained in the time and frequency domain.

Embodiments of the present method also obtain the robustness to transmit antenna correlation and modulation level. The present method according to some embodiments is not sensitive to user equipment movement, compared to previously known solutions. These benefits are achieved at the cost of a feed forward information or each precoding granularity.

As no dedicated reference signals have to be transmitted, overhead signalling within the wireless communication system may be somewhat reduced, leading to increased system capacity.

Other objects, advantages and novel features of the invention will become apparent from the following detailed description of the invention.

BRIEF DESCRIPTION OF THE DRAWINGS

The invention is described in more detail with reference to attached drawings illustrating exemplary embodiments of the invention and in which.

DETAILED DESCRIPTION

The invention is defined as a method and arrangement in a base station and a method and arrangement in a user equipment, which may be put into practice in the embodiments described below. This invention may, however, be embodied in many different forms and is not to be considered as limited to the embodiments set forth herein; rather, these embodiments are provided so that this disclosure will be thorough and complete, and convey the scope of the invention to those skilled in the art.

Still other objects and features of the present invention may become apparent from the following detailed description considered in conjunction with the accompanying drawings. It is to be understood, however, that the drawings are designed solely for purposes of illustration and not as a definition of the limits of the invention, for which reference is to be made to the appended claims. It is further to be understood that the drawings are not necessarily drawn to scale and that, unless otherwise indicated, they are merely intended to conceptually illustrate the structures and procedures described herein.

Figure 1:
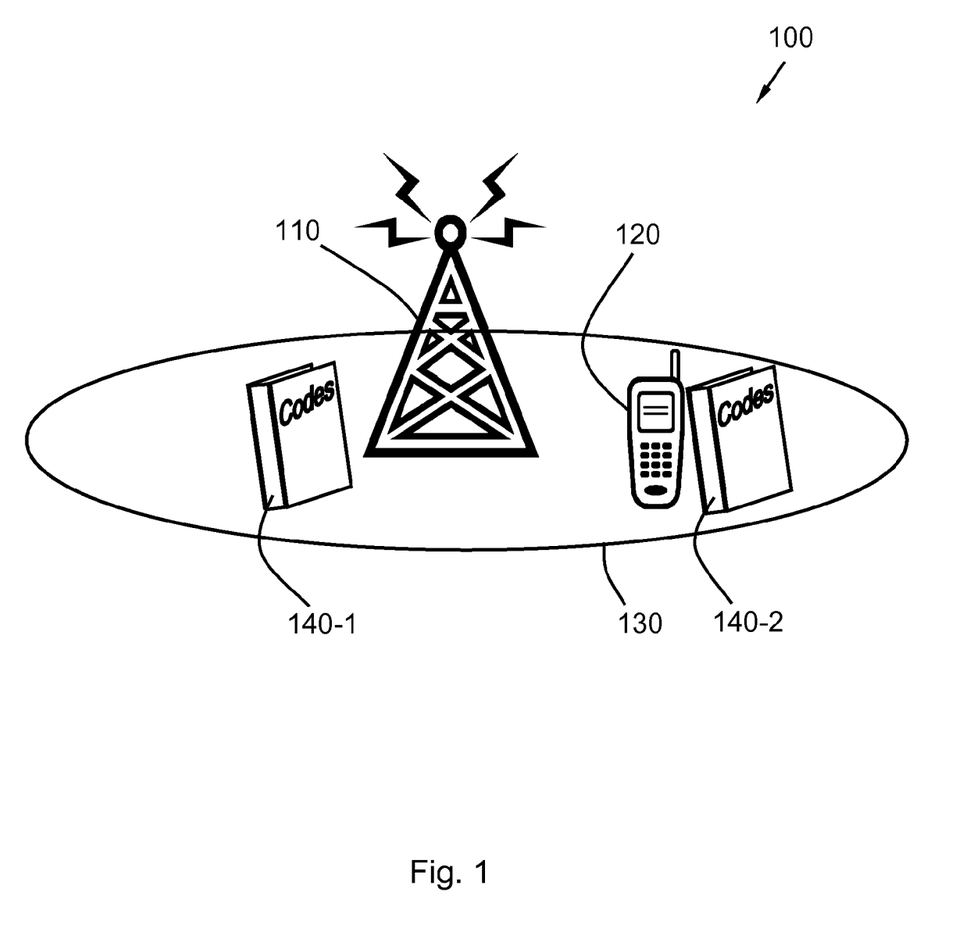
FIG. 1 is a schematic block diagram illustrating a wireless communication system according to some embodiments.

FIG. 1 depicts a wireless communication system 100, such as e.g. 3$^{rd}$ Generation Partnership Project (3GPP) Long Term Evolution (LTE), LTE-Advanced, Evolved Universal Terrestrial Radio Access Network (E-UTRAN), Universal Mobile Telecommunications System (UMTS), Global System for Mobile communications/Enhanced Data rate for GSM Evolution (GSM/EDGE), Code-Division-Multiple-Access (CDMA) networks, Wideband Code Division Multiple Access (WCDMA), Worldwide Interoperability for Microwave Access (WiMax), or Ultra Mobile Broadband (UMB), just to mention some few options. The purpose of the illustration in FIG. 1 is to provide a general overview of the environment in which the present solution is intended to operate.

In the following, the present methods and arrangements are further elaborated with specific reference to 3GPP LTE systems. A number of terminologies from LTE is used in the present context, but, the technique could be used for any other system 100, i.e. Orthogonal Frequency-Division Multiplexing (OFDM) systems. Thus the wireless communication system 100 is thus described as a 3GPP LTE system throughout the rest of the description, for enhanced comprehension and readability. However, it is obvious to a skilled person that corresponding concepts could also be applied in other wireless communication systems 100, including WCDMA, WiMAX, UMB and GSM, etc.

The wireless communication system 100 comprises a base station 110 and at least one user equipment 120 situated in a cell 130. The base station 110 and the user equipment 120 are configured to communicate wirelessly with each other. The base station 110 and the user equipment 120 both have access to an instance of a codebook 140. A plurality of user equipments 120 may be present simultaneously in the same cell 130, but for clarity reasons, only one user equipment 120 is depicted in FIG. 1.

It may be noted that terminology such as "base station" and "user equipment (UE)" should be considered non-limiting and does in particular not imply a certain hierarchical relation between the two; in general "base station" could be considered as device 1 and "UE" device 2, and these two devices communicate with each other over some radio channel.

The base station 110 may be referred to as e.g. a NodeB, an evolved Node B (eNB, or eNodeB), a base transceiver station, Access Point Base Station, base station router, or any other network node configured for communication with the user equipment 120 over a wireless interface, depending e.g. of the radio access technology and terminology used. In the rest of the description, the term "base station" will be used for the base station 110, in order to facilitate the comprehension of the present methods and arrangements.

The user equipment 120 may be represented by e.g. a wireless communication terminal, a mobile cellular phone, a Personal Digital Assistant (PDA), a wireless platform, a laptop, a computer or any other kind of device capable of wireless communication with the base station 110.

The basic concept of the present solution is to perform non-codebook based MIMO precoding without being dependent on using dedicated, or UE specific reference signals for demodulation, but instead using multiple cell specific reference signals for demodulation. The base station 110 may determine the best combination of an actual precoder and a virtual precoder, with the virtual precoder being selected from a predefined codebook 140 whereas the actual precoder needs not to be selected from the codebook 140. The base station 110 may then precode the data transmission with the actual precoder and signal the index of the virtual precoder to the user equipment 120.

As no dedicated reference signals have to be transmitted according to some embodiments, overhead signalling within the wireless communication system 100 is reduced, leading to increased system capacity.

Figure 2:
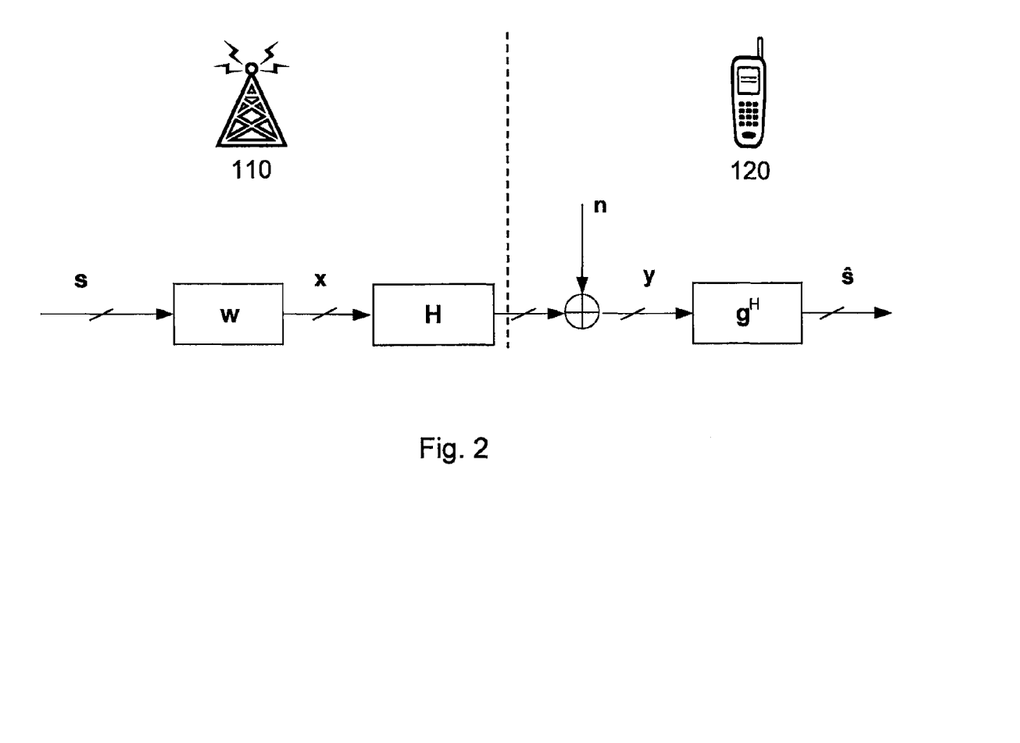
FIG. 2 is a schematic block diagram illustrating a system model of a wireless communication system according to some embodiments.

FIG. 2 schematically discloses a system model comprising single user and single stream. To ease the further description of the invention, a data model is introduced. Due to the properties of Orthogonal Frequency-Division Multiplexing (OFDM), in LTE downlink, the channel model between one transmit antenna and one receive antenna can be viewed to be equivalent to flat-fading channel for each and every subcarrier. In the Multiple-Input Multiple-Output (MIMO) system model considering one OFDM sub-carrier, see FIG. 2, for single user and single stream (rank-1) transmission, s is the symbol to be transmitted, w is the $N_{tx} \times 1$ precoder with $N_{tx}$ being the number of transmit antennas, and H is the $N_{rx} \times N_{tx}$ MIMO channel matrix with $N_{rx}$ being the number of receive antennas. In addition, n is the receiver $N_{rx} \times 1$ Additive White Gaussian Noise (AWGN) vector with each independent entry following $CN(0,N_0)$ and $g^H$ is the $1 \times N_{rx}$ linear equalizer.

Baseband transmission is simply expressed as:

$$y = Hws + n \qquad \text{Eq. 1}$$

and the detected symbol is denoted as $$\hat{s} = g^H y = g^H (Hws + n) \qquad \text{Eq. 2}$$

Figure 3:
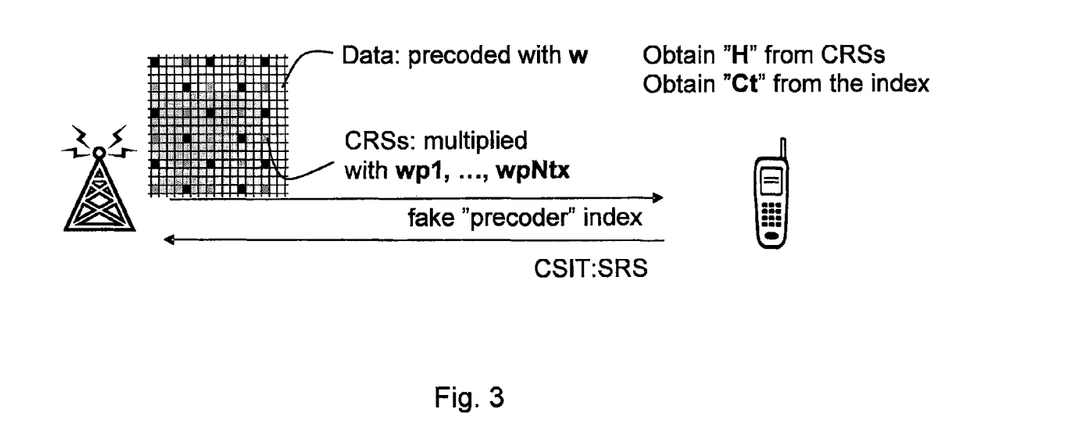
FIG. 3 is a block diagram illustrating an embodiment of the present method.

FIG. 3 illustrates CRS based codebook assisted beamforming, according to some embodiments.

In comparison with the non-codebook based precoding mentioned above, there may be a further side constraint, namely that the precoder with certain advantage may be chosen so as to enable the user equipment 120 to use the cell specific reference signals for channel estimation, and more importantly that a virtual precoder may be selected in addition to the actual precoder.

In an embodiment, the user equipment 120 may report Pre-coding Matrix Index (PMI), possibly frequency selective, which the base station 110 may use to determine the virtual precoder. The details are described below.

In contrast to the non-codebook-based precoding design employing single CRS pattern, since the number of CRS patterns (antenna ports) is equal to the number of physical antennas at the transmitter, it is feasible to reconstruct the whole downlink channel matrix estimate from multiple CRS patterns. A vector $_{pi}$ denotes the $N_{tx} \times 1$ CRS weights for multiple physical antennas associated with antenna port i. The estimates of $Hw_{pi}$ for all i can form the estimate of $H = [Hw_{p1} \ldots Hw_{pN_{tx}}]$ at the user equipment 120. The equalizer $g^H$ is derived based on the estimate of the channel matrix at the user equipment 120.

In the TDD mode, the base station 110 and the user equipment 120 are transmitting over the same frequencies in different time instants. By exploiting channel reciprocity in the TDD mode, the optimal precoder is computed from the available Channel State Information at the Transmitter (CSIT). The illustration for the non-codebook-based precoding schemes employing multiple CRS patterns is shown in FIG. 3, with $\lfloor_{p1\ N_{tx}}\rfloor$ standing for the weights for diverse CRS patterns. The CSIT is obtained at the base station 110 from uplink channel sounding process, or via the Physical Uplink Control Channel (PUCCH), PUSCH, etc.

In order to increase the robustness to the user equipment 120 movement and the corresponding channel time varying property, a novel way of doing non-codebook based precoding with the assistance of a certain codebook is proposed, denoted as the codebook assisted precoding scheme. Due to the usage of sufficient multiple CRS patterns, the whole downlink channel estimate $H_{DL}$ is available at the user equipment 120. The codebook C, predefined and known to both the base station 110 (eNodeB) and the UE 120, is used to produce a fake "precoder" $c_t$ which is only used to form the fake effective channel $g^H = H_{DL} c_t$ at user equipment 120 for data demodulation but is not utilized for data precoding.

For the situation with two physical antennas at the base station 110, the codebook $$C = \frac{1}{\sqrt{2}} \begin{bmatrix} 1 & 1 & 1 & 1 \\ 1 & -1 & j & -j \end{bmatrix} \qquad \text{Eq. 3}$$

with each column denoting one possible fake "precoder". One fake "precoder" may use 2 bits feed-forward information to be signalled down to the user equipment 120. This additional feed-forward requirement may be supported in the control signalling of LTE Rel-8 for the closed-loop spatial multiplexing, or in other systems via appropriate control signalling in DL.

For simplicity, the precoder w and the fake "precoder" $c_t$ may be determined at base station 110. The index of fake "precoder" may be signalled down to the user equipment 120 as control information.

Instantaneous Signal-to-Noise Ratio (SNR) maximization may be chosen as the design criterion, which is equivalent to Symbol Error Rate (SER) minimization for perfect channel estimation case.

$$\hat{s} = (H_{DL} c_t)^H Hws + (H_{DL} c_t)^H n \qquad \text{Eq. 4}$$

Under perfect assumption, $H_{DL} c_t = Hc_t$, the instantaneous SNR, SNR conditioned on channel matrix H, may be formed as $$SNR = \frac{E_s \left[ ((Hc_t)^H Hw)((Hc_t)^H Hw)^H \right]}{E_s \left[ ((Hc_t)^H n)((Hc_t)^H n)^H \right]} \qquad \text{Eq. 5}$$

$$= \frac{P}{N_0} \frac{w^H H^H Hc_t (Hc_t)^H Hw}{(Hc_t)^H Hc_t}$$

where $E_s[ss^*] = P$ and $E_n[nn^*] = N_0 I$.

At the base station 110, based on the channel matrix estimate $H_{UL}$ the instantaneous SNR may be computed as:

$$SNR_{eNodeB} = \frac{w_k^H H_{UL}^H (H_{UL} c_k)(H_{UL} c_k)^H H_{UL} w_k}{(H_{UL} c_k)^H H_{UL} c_k} \qquad \text{Eq. 6}$$

The precoder and the fake "precoder" are derived to maximize $SNR_{eNodeB}$ with respect to the per-antenna power control requirement.

Step-1:

At time instant $t_{UL}$ the base station 110 estimates $H_{UL}$. Then, it selects the fake "precoder" $c_t$ from the codebook C and computes the precoder $w_{UL}$. It uses $w_{UL}$ to precode the data signals, which are sent out at time instant $t_{DL} = t_{UL} +$. The fake "precoder" index is sent to the user equipment 120 as control information. There are K vectors available in the codebook C, K=4 for the case of 2-transmit antennas as in Eq. 3.

Step-1. a: The precoder corresponding to the fake "precoder" for k=1, ..., K do

Step 1. a.i: SNR maximization (total power constraint)

$$w_k = \arg\max_{w_k} [w_k^H H_{UL}^H (H_{UL} c_k)(H_{UL} c_k)^H H_{UL} w_k] \qquad \text{Eq. 7}$$

$$s.t. \ w_k^H w_k = 1$$

$$\mathfrak{R}\{(H_{UL} c_k)^H H_{UL} w_k\} > 0,$$

$$\mathfrak{I}\{(H_{UL} c_k)^H H_{UL} w_k\} = 0$$

$$\Rightarrow w_k = \frac{H_{UL}^H H_{UL} c_k}{|H_{UL}^H H_{UL} c_k|}$$

Step 1. a.ii: Per-antenna equal power control for i=1, ..., $N_{tx}$ do $$w_{ki} = \frac{w_{ki}}{\sqrt{N_{tx}} |w_{ki}|} \qquad \text{Eq. 8}$$

where $w_{ki}$ is the $i^{th}$ component in $w_k$.
end for
end for
Step 1. b: Precoder and fake "precoder" selection (SNR maximization)

$$\phi = \arg\max_{k \in [1, ,K]} \left[ \frac{w_k^H H_{UL}^H (H_{UL} c_k)(H_{UL} c_k)^H H_{UL} w_k}{(H_{UL} c_k)^H H_{UL} c_k} \right] \qquad \text{Eq. 9}$$

$w = w_\phi$ (real precoder)

$c_t = c_\phi$ (fake precoder)

At the user equipment side, the user equipment 120 estimates $H_{DL}$ from multiple CRS-assisted downlink channel estimation and forms $c_t$ from the feed-forward control information. The equalizer can be generated for data demodulation $g^H = H_{DL} c_t$.

In general, the basic concept of the invention applies also when there is only partial channel state information, such as second order statistics of the channel or knowledge about the channel only associated with a subset of the terminal antennas. The base station 110 may, based on the channel knowledge available, select a virtual precoder and an actual precoder for the data so that the user equipment 120 can perform channel estimation using cell specific reference signals assuming that data is precoded using the virtual precoder.

In one embodiment, the user equipment 120 may report the virtual precoder(s) via PMI, and the base station 110 may determine the precoder weights for the data channel under the assumption that the reported precoder(s) are used as virtual precoders.

In another embodiment, the number of cell specific reference signals may be smaller than the number of antennas used for transmission. For example, two cell specific reference signals may be used with an antenna system with eight antennas.

Figure 4:
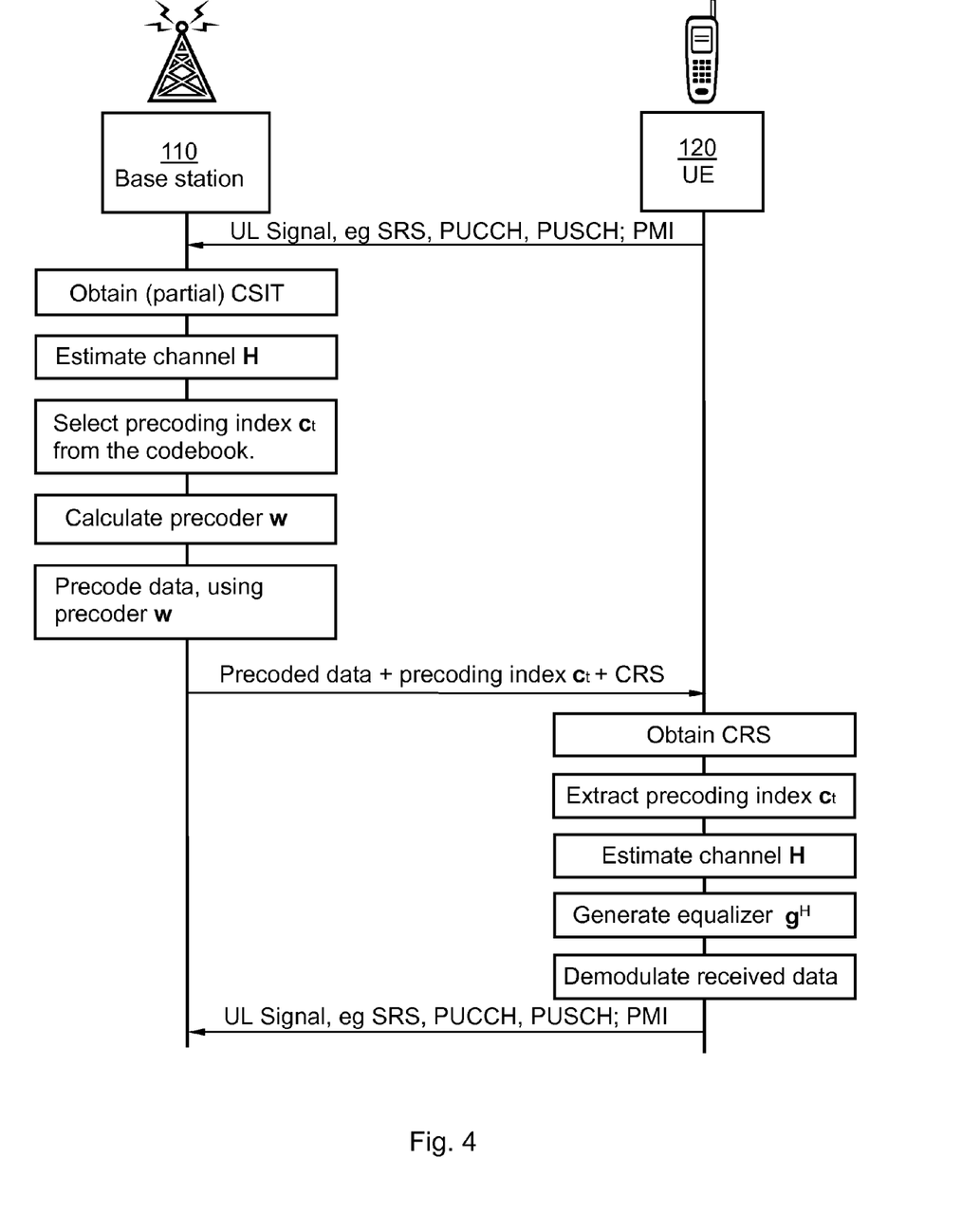
FIG. 4 is a combined flow chart and block diagram illustrating embodiments of the present method in a base station.

FIG. 4 is a combined flowchart and block diagram illustrating an overview of an embodiment of the present method.

In a first step, the user equipment 120 may transmit an UL signal, e.g. a Sounding Reference Signal (SRS). However, the user equipment 120 may transmit another kind of signal, such as PUCCH or PUSCH signal. The signal may be detected by the base station 110. Based on the detected signal, the base station 110 may obtain full or partial Channel State Information at the Transmitter (CSIT). Also, the base station 110 may estimate the downlink channel H for transmitting data to the user equipment 120. Further, the base station 110 may select a precoding index from the codebook 140-1, denoted by virtual precoder. However, according to some embodiments, this virtual precoder may be received from the user equipment 120 instead via PMI feedback. In addition, a precoder w may be calculated. The base station 110 may then be prepared for precoding the data using the precoder w.

The precoded data may then be transmitted to the user equipment 120, together with the precoding index for virtual precoder and a Common Reference Signal (CRS), also known as cell-specific reference signal.

The user equipment 120, upon receiving the Common Reference Signal, may extract the precoding index and estimate the channel H. The user equipment 120 may also generate equalizer g. It is then possible for the user equipment 120 to demodulate received data. Further, the user equipment 120 may in an embodiment, report PMI, possibly frequency selective. The base station 110 may when receiving the PMI use this precoder for virtual precoding of data to be transmitted to the user equipment 120.

Figure 5:
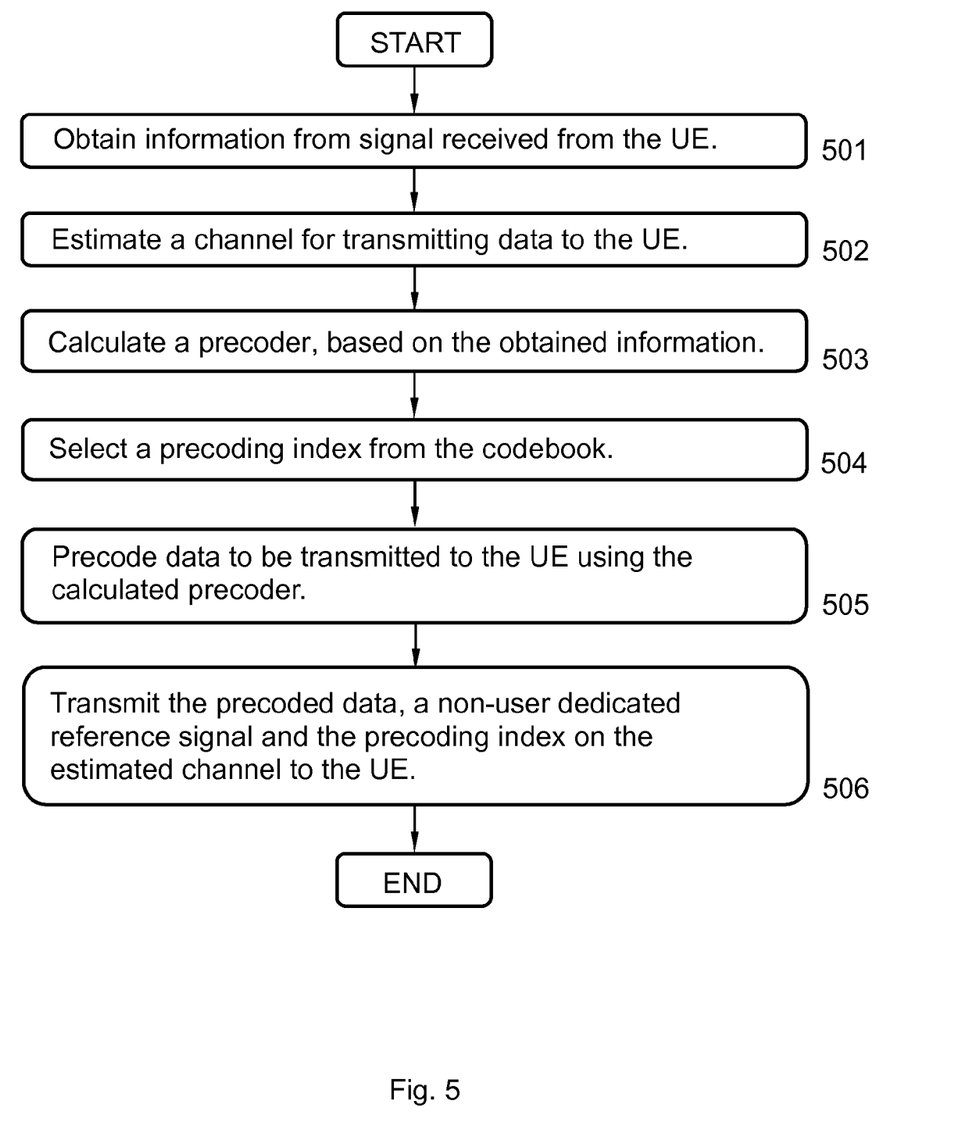
FIG. 5 is a schematic block diagram illustrating an exemplary embodiment of the present method in a base station.

FIG. 5 is a flow chart illustrating embodiments of method steps 501-506 performed in a base station 110. The method steps 501-506 aims at sending data to a user equipment 120. The base station 110 comprises an instance of a codebook 140-1, corresponding to another instance of the codebook 140-2 comprised in the user equipment 120. The base station 110 and the user equipment 120 may be comprised in a wireless communication system 100 e.g. an LTE radio network. The base station 110 may be e.g. an eNode B, according to some embodiments. Further, the base station 110 and the user equipment 120 may be configured to communicate on Time Division Duplex (TDD) mode in LTE based technology, according to some embodiments.

The base station 110 and the user equipment 120 respectively may comprise a plurality of antennas and the method may be performed based on a Multiple-Input Multiple-Output (MIMO) scheme, according to some embodiments.

To appropriately send data to the user equipment 120, the method may comprise a number of method steps 501-506.

It is however to be noted that some of the described method steps are optional and only comprised within some embodiments. Further, it is to be noted that the method steps 501-506 may be performed in a somewhat different chronological order and that some of them, e.g. step 502 and step 503, may be performed simultaneously or in a rearranged chronological order. The method may comprise the following steps:

Step 501

Channel state information is obtained from a signal received from the user equipment 120. The signal received from the user equipment 120 may be e.g. a Sounding Reference Signal (SRS), according to some embodiments.

However, the channel state information may be obtained based on any of: a Sounding Reference Signal (SRS), an uplink channel sounding process, a signal received via a Physical Uplink Control Channel (PUCCH), a signal received via a Physical Uplink Shared Channel (PUSCH) or Pre-coding Matrix Index (PMI), according to various embodiments.

Step 502

A channel H to be used for transmitting data to the user equipment 120 is estimated.

Step 503

A precoder w is calculated, based on the obtained channel state information. The precoder w may be used for precoding the data to be sent to the user equipment 120.

According to some embodiments, the calculation of the precoder w is performed in order to maximize the Signal-to-Noise Ratio (SNR).

Step 504

A precoding index $c_t$ may be selected from the codebook 140-1, based on the calculated precoder w. Alternatively, according to some embodiments, the precoding index $c_t$ may be received from the user equipment 120.

Step 505

Data to be transmitted to the user equipment 120 is precoded, using the calculated precoder w.

Step 506

The precoded data, a non-user dedicated reference signal and the precoding index $c_t$ is transmitted on the estimated channel H to the user equipment 120.

The non-user dedicated reference signal may be e.g. a Common Reference Signal (CRS) or a Cell-specific Reference Signal (CRS).

The number of non-user dedicated reference signals may be less than the number of antennas used for transmission, according to some embodiments.

Figure 6:
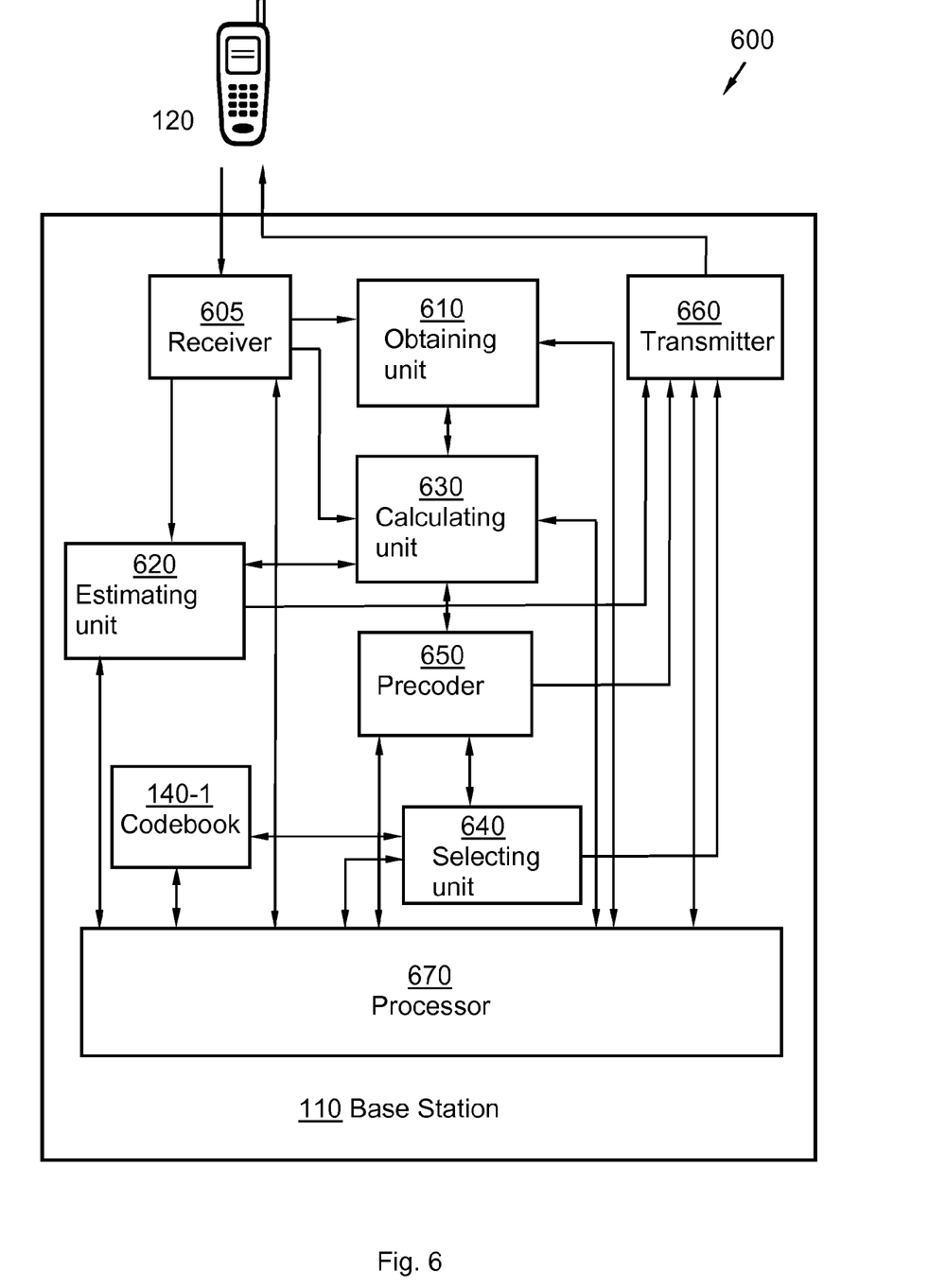
FIG. 6 is a schematic block diagram illustrating an exemplary embodiment of the present base station arrangement.

FIG. 6 schematically illustrates an arrangement 600 in a base station 110. The arrangement 600 is adapted to perform any, some or all of the method steps 501-506 in order to send data to a user equipment 120.

The base station 110 comprises an instance of a codebook 140-1, corresponding to another instance of the codebook 140-2 comprised in the user equipment 120.

The base station 110 and the user equipment 120 may be comprised in a wireless communication system 100 e.g. an LTE radio network. The base station 110 may be e.g. an eNode B, according to some embodiments. Further, the base station 110 and the user equipment 120 may be configured to communicate on TDD mode in LTE based technology, according to some embodiments.

The base station 110 and the user equipment 120 respectively may comprise a plurality of antennas and the method may be performed based on a MIMO scheme, according to some embodiments.

In order to perform the method steps 501-506 correctly, the base station arrangement 600 comprises e.g. an obtaining unit 610. The obtaining unit 610 is configured to obtain channel state information from a signal received from the user equipment 120. Further, the arrangement 600 comprises an estimating unit 620. The estimating unit 620 is configured to estimate a channel H for transmitting data to the user equipment 120. In addition, the base station arrangement 600 also comprises a calculating unit 630. The calculating unit 630 is configured to calculate a precoder w, based on the obtained channel state information. Furthermore, the base station arrangement 600 also comprises a selecting unit 640. The selecting unit 640 is configured to select a precoding index $c_t$ from the codebook 140-1. Also, in further addition, the base station arrangement 600 comprises a precoder 650. The precoder 650 is configured to precode data to be transmitted to the user equipment 120, using the calculated precoder w. The base station arrangement 600 comprises a transmitter 660. The transmitter 660 is configured to transmit the precoded data, a non-user dedicated reference signal and the precoding index $c_t$ on the estimated channel H to the user equipment 120.

Further, according to some embodiments, the base station arrangement 600 may comprise a receiver 605. The receiver 605 may be configured to receive signals from e.g. the user equipment 120. In addition, the arrangement 600 may comprise a processor 670. The processor 670 may be configured to process the received information data by applying an algorithm.

The processor 670 may be represented by e.g. a Central Processing Unit (CPU), a microprocessor, or other processing logic that may interpret and execute instructions. The processor 670 may perform all data processing functions for inputting, outputting, and processing of data including data buffering and device control functions, such as call processing control, user interface control, or the like.

It is to be noted that any internal electronics of the base station 110 and/or the base station arrangement 600, not completely necessary for understanding the present method according to the method steps 501-506 has been omitted from FIG. 6, for clarity reasons.

Further, it is to be noted that some of the described units 605-670 comprised within the arrangement 600 in the base station 110 are to be regarded as separate logical entities but not with necessity separate physical entities. To mention just one example, the receiving unit 605 and the transmitter 660 may be comprised or co-arranged within the same physical unit, a transceiver, which may comprise a transmitter circuit and a receiver circuit, which transmits outgoing radio frequency signals and receives incoming radio frequency signals, respectively, via an antenna. The radio frequency signals transmitted between the base station 110 and the user equipment 120 may comprise both traffic and control signals e.g. paging signals/messages for incoming calls, which may be used to establish and maintain a voice call communication with another party or to transmit and/or receive data, such as SMS, e-mail or MMS messages, with a remote user equipment.

The method steps 501-506 in the base station 110 may be implemented through one or more processors 670 in the base station 110, together with computer program code for performing at least some of the functions of the present method steps 501-506. Thus a computer program product, comprising instructions for performing the method steps 501-506 in the base station 110 may manage the transmission of data to the user equipment 120, when the computer program product is loaded into the processor 670.

The computer program product mentioned above may be provided for instance in the form of a data carrier carrying computer program code for performing the method steps according to the present solution when being loaded into the processor unit 670. The data carrier may be e.g. computer readable storage medium such as a hard disk, a CD ROM disc, a memory stick, an optical storage device, a magnetic storage device or any other appropriate medium such as a disk or tape that can hold machine readable data. The computer program code can furthermore be provided as program code on a server and downloaded to the base station 110 remotely, e.g. over an Internet or an intranet connection.

Figure 7:
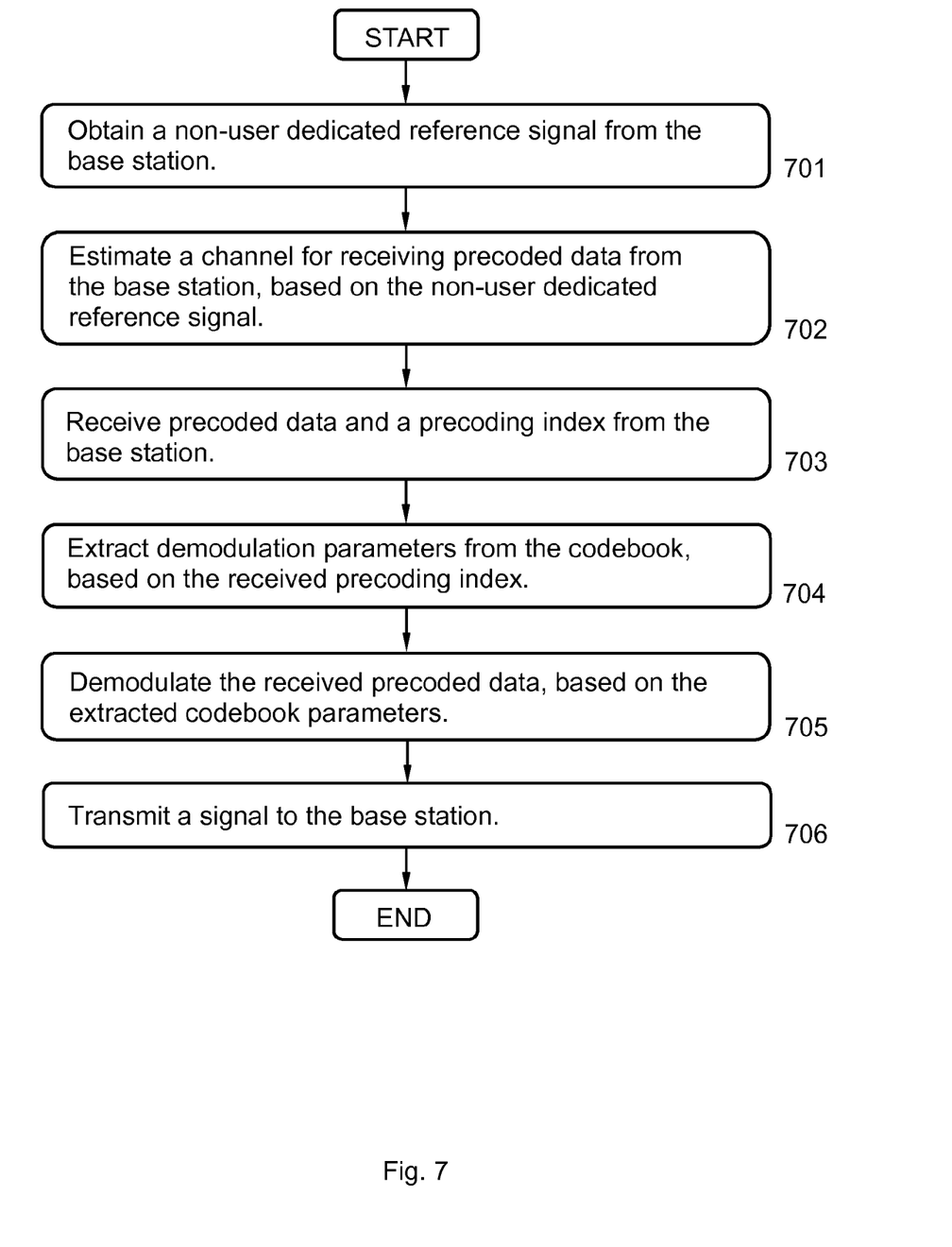
FIG. 7 is a schematic block diagram illustrating an exemplary embodiment of the present method in a user equipment.

FIG. 7 is a flow chart illustrating embodiments of method steps 70-706 performed in a user equipment 120. The method steps 701-706 aims at receiving data from a base station 110. The user equipment 120 comprises an instance of a codebook 140-2, corresponding to another instance of the codebook 140-1 comprised the base station 110. The base station 110 and the user equipment 120 may be comprised in a wireless communication system 100 e.g. an LTE radio network. The base station 110 may be e.g. an eNode B, according to some embodiments. Further, the base station 110 and the user equipment 120 may be configured to communicate on TDD mode in LTE based technology, according to some embodiments.

The base station 110 and the user equipment 120 respectively may comprise a plurality of antennas and the method may be performed based on a MIMO scheme, according to some embodiments.

To appropriately receive data from the base station 110, the method may comprise a number of method steps 701-706.

It is however to be noted that some of the described method steps are optional and only comprised within some embodiments, such as e.g. step 706. Further, it is to be noted that the method steps 701-706 may be performed in a somewhat different chronological order and that some of them, e.g. step 702 and step 703, may be performed simultaneously or in a rearranged chronological order. The method may comprise the following steps:

Step 701

A non-user dedicated reference signal is obtained from the base station 110.

The non-user dedicated reference signal may be e.g. a Common Reference Signal (CRS) or a Cell-specific Reference Signal (CRS).

The number of non-user dedicated reference signals may be less than the number of antennas used for transmission, according to some embodiments.

Step 702

A channel H for receiving precoded data from the base station 110 is estimated, based on the non-user dedicated reference signal.

Step 703

Precoded data and a precoding index related to $c_t$ is received from the base station 110 over the channel H.

Step 704

Demodulation parameters are extracted from the codebook 140-2, based on the received precoding index $c_t$.

Step 705

The received precoded data is demodulated, based on the extracted codebook parameters.

Step 706

This step is optional and is only performed within some embodiments.

A signal may be transmitted to the base station 110, enabling the base station 110 to obtain channel state information.

The signal may comprise any of: a Sounding Reference Signal (SRS), an uplink channel sounding process, a signal received via a Physical Uplink Control Channel (PUCCH), a signal received via a Physical Uplink Shared Channel (PUSCH), Pre-coding Matrix Index (PMI) or the precoding index $c_t$.

Thus, according to some embodiments, the precoding index $c_t$ may be transmitted to the base station 110, which may bring the advantage of reducing the amount of calculations on the base station side.

Figure 8:
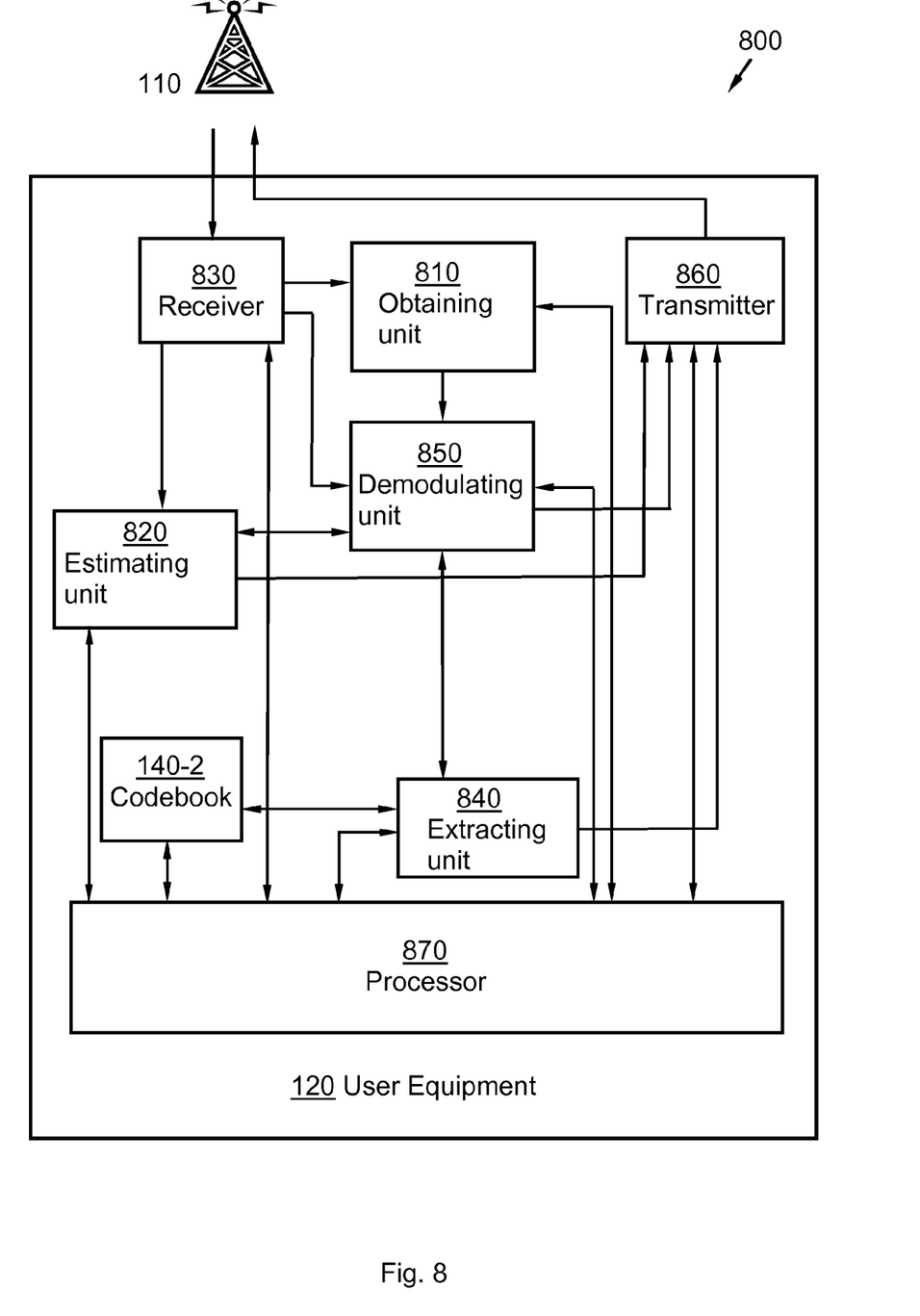
FIG. 8 is a schematic block diagram illustrating an exemplary embodiment of the present user equipment arrangement.

FIG. 8 schematically illustrates an arrangement 800 in a user equipment 120. The arrangement 800 is adapted to perform any, some or all of the method steps 701-706 in order to receive data from a base station 110.

The user equipment 120 comprises an instance of a codebook 140-2, corresponding to another instance of the codebook 140-1 comprised the base station 110. The base station 110 and the user equipment 120 may be comprised in a wireless communication system 100 e.g. an LTE radio network. The base station 110 may be e.g. an eNode B, according to some embodiments. Further, the base station 110 and the user equipment 120 may be configured to communicate on TDD mode in LTE based technology, according to some embodiments.

The base station 110 and the user equipment 120 respectively may comprise a plurality of antennas and the method may be performed based on a MIMO scheme, according to some embodiments.

In order to perform the method steps 701-706 correctly, the user equipment arrangement 800 comprises e.g. an obtaining unit 810. The obtaining unit 810 is configured to obtain a non-user dedicated reference signal from the base station 110. Further, the arrangement 800 comprises an estimating unit 820. The estimating unit 820 is configured to estimate a channel H for receiving precoded data from the base station 110, based on the non-user dedicated reference signal. Furthermore, the user equipment arrangement 800 also comprises a receiver 830. The receiver 830 is configured to receive precoded data and a precoding index $c_t$ from the base station 110. Also, in further addition, the user equipment arrangement 800 comprises an extracting unit 840. The extracting unit 840 is configured to extract demodulation parameters from the codebook 140-2, based on the received precoding index $c_t$. The user equipment arrangement 800 comprises a demodulating unit 850. The demodulating unit 850 is configured to demodulate the received precoded data based on the demodulated codebook parameters.

Further, according to some embodiments, the user equipment arrangement 800 may comprise a transmitter 860. The transmitter 860 may be configured to send signals to e.g. the base station 110. In addition, the arrangement 800 may comprise a processor 870. The processor 870 may be configured to process the received information data by applying an algorithm.

The processor 870 may be represented by e.g. a Central Processing Unit (CPU), a microprocessor, or other processing logic that may interpret and execute instructions. The processor 870 may perform all data processing functions for inputting, outputting, and processing of data including data buffering and device control functions, such as call processing control, user interface control, or the like.

It is to be noted that any internal electronics of the user equipment 120 and/or the user equipment arrangement 800, not completely necessary for understanding the present method according to the method steps 701-706 has been omitted from FIG. 8, for clarity reasons.

Further, it is to be noted that some of the described units 810-870 comprised within the arrangement 800 in the user equipment 120 are to be regarded as separate logical entities but not with necessity separate physical entities. To mention just one example, the receiving unit 830 and the transmitter 860 may be comprised or co-arranged within the same physical unit, a transceiver, which may comprise a transmitter circuit and a receiver circuit, which transmits outgoing radio frequency signals and receives incoming radio frequency signals, respectively, via an antenna. The radio frequency signals transmitted between the base station 110 and the user equipment 120 may comprise both traffic and control signals e.g. paging signals/messages for incoming calls, which may be used to establish and maintain a voice call communication with another party or to transmit and/or receive data, such as SMS, e-mail or MMS messages, with a remote user equipment.

The method steps 701-706 in the user equipment 120 may be implemented through one or more processors 870 in the user equipment 120, together with computer program code for performing at least some of the functions of the present method steps 701-706. Thus a computer program product, comprising instructions for performing the method steps 701-706 in the user equipment 120 may manage the reception of data from the base station 110, when the computer program product is loaded into the processor 870.

The computer program product mentioned above may be provided for instance in the form of a data carrier carrying computer program code for performing the method steps according to the present solution when being loaded into the processor unit 870. The data carrier may be e.g. computer readable storage medium such as a hard disk, a CD ROM disc, a memory stick, an optical storage device, a magnetic storage device or any other appropriate medium such as a disk or tape that can hold machine readable data. The computer program code can furthermore be provided as program code on a server and downloaded to the user equipment 120 remotely, e.g. over an Internet or an intranet connection.

When using the formulation "comprise" or "comprising" it is to be interpreted as non-limiting, i.e. meaning "consist at least of". The present invention is not limited to the above described preferred embodiments. Various alternatives, modifications and equivalents may be used. Therefore, the above embodiments are not to be taken as limiting the scope of the present invention, which is defined by the appending claims.

Further by means of example and in order to simplify the comprehension, the term SNR has been consistently used in this text when describing a Signal-to-Noise Ratio, which is the ratio between the level of a desired signal to the level of background noise and signal disturbance. The higher the ratio, the less obtrusive is the background noise. However, there exist other acronyms which are sometimes used to describe the same or a similar ratio, like e.g. the Signal to noise and Interference Ratio (SIR), Signal to Noise Ratio (S/N), Signal to Noise and Interference Ratio (SNIR), Signal to Interference and Noise Ratio (SINR) or an inversion of the ratio, like Interference to Signal Ratio, (ISR). Any of these or similar ratios may be used in the context of this description instead of the SNR.

The invention claimed is:

1. A method in a base station for sending data to a user equipment, wherein the base station includes an instance of a codebook corresponding to another instance of the codebook in the user equipment, and the method comprises:
obtaining channel state information from a signal received from the user equipment;
estimating a channel to be used for transmitting data to the user equipment;
calculating a non-codebook based precoder, based on the obtained channel state information;
selecting a precoding index from the codebook based on the calculated non-codebook based precoder;

precoding data to be transmitted to the user equipment using the calculated non-codebook based precoder; and transmitting the precoded data, non-user dedicated reference signals and the precoding index on the estimated channel to the user equipment.

2. The method according to claim 1, wherein the base station and the user equipment each include a plurality of antennas and wherein the method is performed based on a Multiple-Input Multiple-Output (MIMO) scheme.

3. The method according to claim 1, wherein the channel state information is obtained based on any of: a Sounding Reference Signal (SRS), an uplink channel sounding process, a signal received via a Physical Uplink Control Channel (PUCCH), a signal received via a Physical Uplink Shared Channel (PUSCH) or Pre-coding Matrix Index (PMI).

4. The method according to claim 1, wherein the step of calculating the precoder is performed in order to maximize the Signal-to-Noise Ratio (SNR).

5. The method according to claim 1, wherein the non-user dedicated reference signal is any of a Common Reference Signal (CRS) or a Cell-specific Reference Signal (CRS).

6. The method according to claim 1, wherein the number of non-user dedicated reference signals is less than the number of antennas used for transmission.

7. The method according to claim 1, wherein the base station is configured to communicate with the user equipment using Time Division Duplex (TDD) mode in Long Term Evolution (LTE) based technology.

8. An arrangement in a base station configured to send data to a user equipment, wherein the base station includes an instance of a codebook that corresponds to another instance of the codebook in the user equipment, and the arrangement comprises:

an obtaining unit configured to obtain channel state information from a signal received from the user equipment;

an estimating unit configured to estimate a channel for transmitting data to the user equipment;

a calculating unit configured to calculate a non-codebook based precoder, based on the obtained channel state information;

a selecting unit configured to select a precoding index from the codebook based on the calculated non-codebook based precoder;

a precoder configured to precode data to be transmitted to the user equipment using the calculated non-codebook based precoder; and a transmitter configured to transmit the precoded data, a non-user dedicated reference signal and the precoding index on the estimated channel to the user equipment.

\* \* \* \* \*